United States Patent [19]

Hallock

[11] 4,031,802

[45] June 28, 1977

[54] HOLLOW SHEET METAL NAIL

[75] Inventor: Robert L. Hallock, Boca Raton, Fla.

[73] Assignee: E. S. Products, New Rochelle, N.Y.

[22] Filed: Jan. 12, 1976

[21] Appl. No.: 648,211

[52] U.S. Cl. .................................. 85/11; 85/31
[51] Int. Cl.² ...................... E01B 9/12; F16B 15/04
[58] Field of Search ............. 85/11, 31, 26, 85, 49, 85/13, 28

[56] References Cited

UNITED STATES PATENTS

| 1,944,150 | 1/1934 | Brugge | 85/28 |
| 3,234,841 | 2/1966 | Adams | 85/13 |
| 3,466,967 | 9/1969 | Hallock | 85/11 |
| 3,538,488 | 11/1970 | Damm et al. | 85/11 X |
| 3,710,672 | 1/1973 | Hallock | 85/11 |
| 3,812,817 | 5/1974 | Hallock | 85/11 X |
| 3,878,756 | 4/1975 | Hallock | 85/31 X |

FOREIGN PATENTS OR APPLICATIONS 920,221  11/1954  Germany .............................. 85/11

Primary Examiner—Ramon S. Britts
Attorney, Agent, or Firm—A. Yates Dowell, Jr.

[57] ABSTRACT

A sheet metal nail of the type used to fasten a first or covering material to a lightweight base material in which a pair of interfitted channel shaped leg or shank members are pivotally connected to the nail head in a manner to spread outwardly into the base material when the nail is driven therein. The penetrating ends of the shank members are tapered to form cutting edges so that as the nail is driven, the penetrating ends of the shank members cut through the first material without tearing such material.

1 Claim, 10 Drawing Figures

HOLLOW SHEET METAL NAIL

BACKGROUND OF THE INVENTION

1. Field of the Invention

This invention relates generally to sheet metal nails and more specifically to hollow sheet metal nails having legs or shank portions which are moved outwardly when driven into a lightweight base material and allow the volume defined between the leg portions to be filled with the base material and thereby aid in preventing the nail from being withdrawn therefrom.

2. History of the Prior Art

Although there are numerous varieties of fasteners which are commonly referred to or categorized as deflecting point nails, not all such fasteners are suitably used in similar applications. Particularly, most nails having spreadable shanks are specifically designed to be driven into a dense material, such as wood, and therefore rely on the resistance of the material to cause the shank to deflect as the nail is driven. There are, however, practical applications where the base material into which a fastener is to be driven is soft or less dense than wood.

One such practical application wherein it is necessary to provide a driven fastener which can be used in a hardenable material is in the securing of roofing felt, paper and the like to poured lightweight insulating roofing decks of vermiculite, perlite, gypsum or similar material. Such uses require that the fastening element be capable of securing the roofing felt or similar material to the roof deck base material before the base material has completely hardened. Particularly, the fastener must provide sufficient restraint on the covering material to prevent the same from being uplifted or separated from the base material by high winds as the base material sets up.

The inventor's prior U.S. Pat. Nos. 3,466,967 and 3,710,672 disclose nails having shank portions which can be deflected outwardly as the nail is driven into a hardenable base material such as a poured perlite roof deck. U.S. Pat. No. 3,710,672 was particularly well adapted for use in attaching various sheets of roofing material to the hardenable base material as its channeled shank design allowed both for ease of shank deflection and complete penetration of the shank into the base material. Such structure normally permitted the base material to substantially fill the volume defined between the deflected leg portions and thereby act as a plug to aid in preventing the nail from being pulled loose or free.

The sheet metal nail of U.S. Pat. No. 3,710,672 proved effective for use in most circumstances, however, it was discovered that under certain climatic and other conditions, the nail had a tendency to tear through the roofing felt or similar material being attached to the base layer. Sometimes, cold temperature caused the roofing felt to stiffen and as the nail was driven therethrough a plug of the felt was ripped or torn therefrom. Further, in many instances, these irregularly shaped plugs spanned the gap between the tips or penetrating edges of the diverging leg portions and thereby either prevented the leg portions from spreading apart when the nail was driven into the base material or prevented the base material from completely or adequately filling the space therebetween.

Similar difficulties were encountered when heavy gauge or thick layers of roofing felt or other such material were used to cover the base material. And again, the plug of covering material actually worked, in some instances, as a barrier which either displaced the base material from the tip of the shank or bound the leg portions together. In those instances when the plug interfered with the spreading of the channeled leg portions of the nail and/or obstructed the passage of the base material into the volume defined between the leg portions, the effective holding capacity of the nail was severely reduced.

In view of the foregoing, it was necessary to develop a fastener having the desirable holding capacity of the nail of U.S. Pat. No. 3,710,672 but which prevented the plug of a covering material from interfering with the proper functioning of the nail.

Examples of the prior art include U.S. Pat. No. 2,745,308 to Gisundi; U.S. Pat. No. 2,283,243 to Vatet; U.S. Pat. No. 3,003,386 to Cryden; Italian Pat. No. 509,032 to Boccarena; and German Pat. No. 920,221 to Gruber.

SUMMARY OF THE INVENTION

The present invention is embodied in a sheet metal nail having a pair of opposed interfitting channel shaped leg or shank portions which have generally inwardly curved opposed sides and which are bendable outwardly from each other when the nail is driven into gripping relationship with a base material. The penetrating end of each of the leg portions includes at least two beveled side cutting edges which are inclined from the end of the nail toward the head thereof at an angle of between 20° and 45°.

It is an object of the invention to provide a hollow sheet metal nail for attaching a covering layer such as roofing felt and the like to a poured lightweight aggregate base material which nail when driven through the covering layer cleanly cuts therethrough thereby preventing the plug of material cut from blocking or otherwise interfering with the penetrating end of the nail or from restricting the deflection of the leg portions as the nail is driven.

It is a further object of the invention to provide a sheet metal nail of the type described which can be easily and simply formed from a single piece of metal without utilizing any welding operations.

DESCRIPTION OF THE PREFERRED EMBODIMENTS

Figure 1:
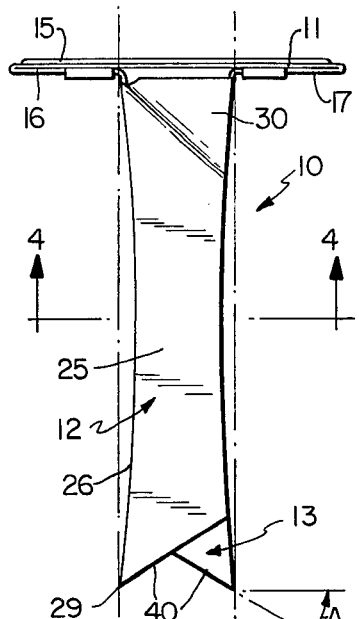
FIG. 1 is a side elevation of the nail showing the opposed curved sides and the beveled cutting edges of the penetrating end.
Figure 2:
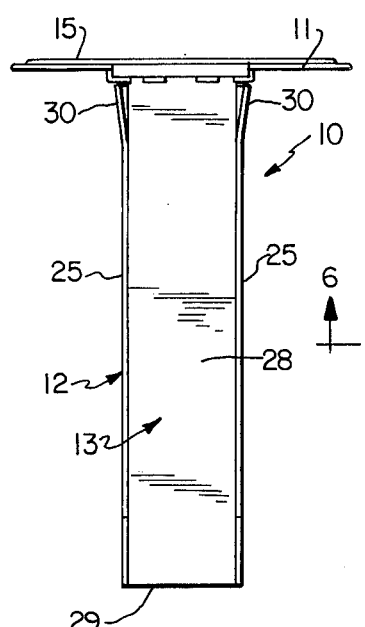
FIG. 2 is a front view of the nail of FIG. 1.

With continued reference to the drawing, a hollow sheet metal nail 10 is formed of a single piece or blank of metal and has an enlarged head 11 and a pair of interfitted channel shaped leg or shank portions 12 and 13. The head of the nail has upper and lower surfaces and is strengthened by a plurality of raised reinforcing ribs 14 and 15 which are disposed across and around the upper surface thereof.

The leg portions 12 and 13 are integrally connected to opposing sides of the head 11 by connecting strips 16 and 17, respectively. The connecting strips are folded back along the lower surface of the head and are joined thereto by retaining ears 18 and 20 which are punched through the head adjacent the leg portions 12 and 13 and are wrapped about the strips 16 and 17 to maintain the upper ends of such leg portions in position.

Figure 3:
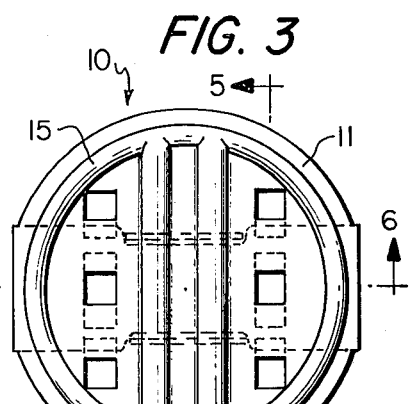
FIG. 3 is a top plan view of the head of the invention.
Figure 5:
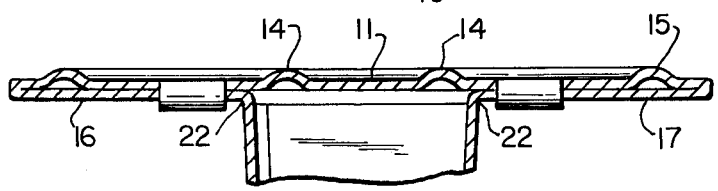
FIG. 5 is an enlarged fragmentary section taken along line 5—5 of FIG. 3.

With particular reference to FIG. 3, the connecting ears 18 are punched from the head and folded over the side of the connecting strips 16 and 17. The connecting ears 20, however, are punched through the head and through the central portion of the connecting strips and are folded into engagement with the connecting strips in opposed relation to the ears 18. Such an assembly not only securely binds the connecting strips of the leg portions 12 and 13 to the head, but does so without requiring separate fastening elements or without any welding operations. Further, because the punched ears 20 are formed through the connecting strips 16 and 17 adjacent the leg portions, each of such leg portions are effectively hinged to the head via two hinged portions 22. Because the hinge-like connection of the legs to the strips 16 and 17 are substantially aligned with the opening 20 as opposed to being along the entire width of the connection strips, the force necessary to deflect the legs outwardly when the nail is driven is reduced to a minimum.

Each of the leg or shank portions 12 and 13 is generally U-shaped in cross-section (FIG. 4) and the leg portions 12 includes a pair of generally parallel arms 25 connected by a bight portion or wall 26 while the leg portion 13 includes generally parallel arms 27 connected by a bight portion or wall 28. Each of the walls 26 and 28 includes an inwardly curved central portion which is integrally connected at its upper end to the leg hinge portions 22. The ends of the leg portions remote from the head form cutting and penetrating edges 29. As shown in FIG. 1, it is preferred that the penetrating edges 29 of the leg portions be spaced apart by approximately the same dimension as that of the hinge. Thus, as the nail is driven and the penetrating end of the nail initially passes through or penetrates into the material, the size of the opening created will not be larger than the cross-sectional dimension of the shank or leg portions adjacent the hinge portions 22. Further, the inward curvatures of the walls 26 and 28 engage the material located between the same and cause the leg portions 12 and 13 to be deflected outwardly as the nail is driven.

Figure 4:
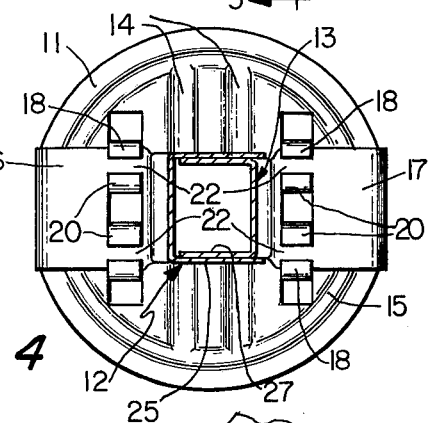
FIG. 4 is a sectional view taken along line 4—4 of FIG. 1.
Figure 6:
FIG. 6 is an enlarged fragmentary section taken along line 6—6 of FIG. 3.

The parallel arms 25 and 27 extend perpendicularly from both sides of the central portions or walls 26 and 28, respectively, with the arms 27 of the leg portion 13 being located between the arms 25 of the leg portion 12, as illustrated in FIG. 4. The arms 25 and 27 are of sufficient dimension to define or limit the minimum distance at which the penetrating edges will be disposed relative to each other when the legs are in an interfitted arrangement. Such a limiting feature insures that the legs will be properly positioned relative to one another, as discussed above, as the nail initially penetrates a material by the user simply squeezing the legs together as the nail is held in a driving position on the working surface. Further, the upper portions 30 of each of the arms 25 are flared slightly outwardly so as to insure the proper nesting of the legs with one another when they are initially folded and formed during the production.

Figure 10:
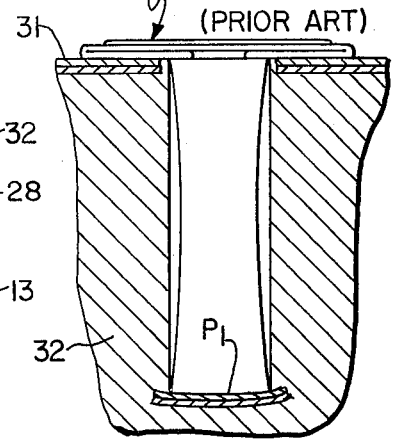
FIG. 10 is a side elevation of a prior art nail in use.

The types of nails in which this invention is included are generally suited for particular uses in attaching covering layers, such as roofing felt or the like 31, to poured insulating deck material such as "Zonolite", gypsum, perlite, vermiculite, or other material 32. Prior to the nail of this invention, several problems had arisen that were peculiar to the use of similar types of nails. With reference to FIG. 10, a prior art hollow metal nail 34 having a pair of deflecting legs is shown as it is driven through a covering layer 31 into an insulating deck material 32. In some instances, as when the covering layer is thick or too brittle, when the nail is driven, a ragged plug $P_1$ of the material is torn from the layer and the end of the nail is partially embedded within such plug. Not only does the tearing of a plug from the main body of the covering layer in some instances cause unwanted breaks or tears in areas adjacent the plug, but the plug has frequently been found to block or otherwise prevent the necessary deflection of the shank members as the nail is driven into the deck or base material 32. This interference with the penetrating portion of the prior art nails not only prevents the shank portions of the nail from separating, but also prevents the base material from filling the area around and between the shank portions, as is illustrated. Because of the foregoing, the prior art nail 34 could be easily withdrawn or worked loose from the base material when such interference occurred.

In order to prevent the blocking or other interference of a plug of the covering material with the nail of the present invention, each of the arms 25 and 27 includes beveled or inclined shearing edges 40. The shearing edges extend from the penetrating edges 29 of the legs 12 and 13 back toward the head at an angle A of generally between 20° and 45° from a horizontal plane, relative to the penetrating end of the nail, as shown in FIG. 1. In practice, an inclined shearing edge angle of 30° has been found to allow for both the necessary cutting action as well as provide as much surface area as possible to insure the necessary clinging action to be maintained between the nail and an insulating material into which the nail is driven.

Further, although not shown in the drawing, the beveled shearing edges may be stamped or sharpened in some manner to present a sharpened cutting edge, thereby increasing the ease with which the nail cuts through the covering layer. It should be noted, however, that the inclined edges 40 are to function to cut through a material as opposed to simply defining a beveled surface which may be pushed through a material. This being the case, the thickness or smallest dimension of the cutting edge should be maintained as narrow as possible and is preferably not greater than the thickness or narrowest dimension of the penetrating edges 29 which may be as little as 0.012 inch or less, dependent upon the actual thickness of sheet metal used to manufacture the nail.

Figure 8:
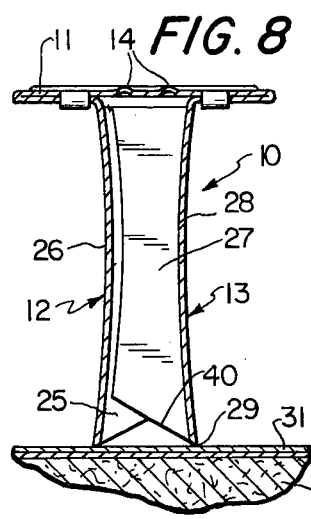
FIG. 8 is a vertical section of a nail of the present invention prior to being driven through a covering layer into the base material.
Figure 9:
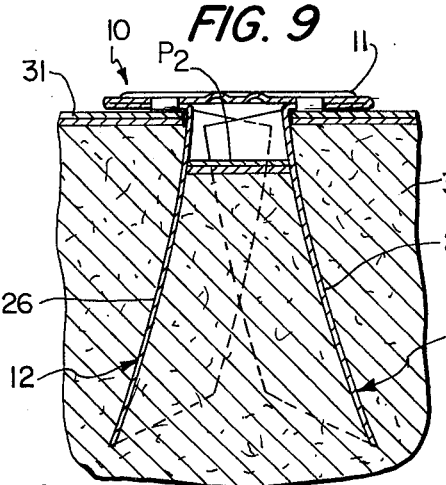
FIG. 9 is a section similar to FIG. 8 after the nail is driven and showing the position of the plug cut from the covering layer.

With reference to FIGS. 8 and 9, the nail of the present invention is shown as being driven through the covering layer 31 into the insulating base material 32. The cutting edges of the nail 10 allow the penetration end of the nail to cleanly cut through the covering layer 31 and sever a plug $P_2$ therefrom. Because the inclined shearing edges of the nail actually slice through the covering material, the plug $P_2$ is cleanly cut and passes easily between the deflecting leg portions without blocking or binding the same. Thus the leg or shank portions of the nail are free to be deflected as the nail is driven so that the insulating base material fills the area between the legs, thereby binding the nail securely.

Figure 7:
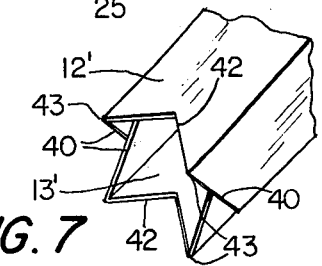
FIG. 7 is a fragmentary perspective of another embodiment of the invention.

Another embodiment of the invention is shown in FIG. 7. In this embodiment, the penetrating edges 29' of the leg portions 12' and 13' are beveled upwardly from each end to form generally V-shaped cutting edges 42 which together with the side shearing edges 40 define a plurality of spaced penetrating points 43. The angle of the V-shaped cutting edges is generally the same as that of the side shearing edges 40, normally between 20° and 45° with 30° being the preferred angle necessary to maintain as much surface area as possible as well as insure that the nail cuts cleanly through the material. When using the nail of this embodiment of the invention, the four penetrating points will initially pierce the covering material and the edges 40 and 42 will permit the nail to cut all four sides of a plug $P_2$.

In use, the hollow sheet metal nail is positioned with its penetrating end in engagement with a covering layer for a lightweight insulating construction material. With the initial impact of force on the head, the penetrating edge initially chisels through the covering material. As the nail shank continues to be driven, the side edges cleanly cut through the covering material thereby severing a well defined plug therefrom which will not bind the legs or shank portions together but which will pass easily therebetween. After the penetrating end of the nail passes into the base construction material, the arcuate shank walls cause the leg portions to be deflected outwardly allowing the base material to fill and be somewhat compacted in the volume defined therebetween.

By utilizing nails having penetrating ends defined by cutting edges which are beveled at angles of between 20° and 45°, the amount of surface area necessary to achieve increased holding efficiency between the base material and the nail is substantially maintained with the added advantage being achieved of cleanly cutting and removing a plug of the covering material as the nail is driven.

I claim:

1. A one-piece hollow sheet metal nail for attaching a non-woven covering material to a lightweight insulating base material comprising a head, a pair of connecting strips integrally connected to opposite sides of said head and being bent to a position underlying the same, the other ends of said strips being attached to one end of a pair of interfitting generally U-shaped legs, each of said legs including a pair of generally parallel sides connected by a bight portion, the sides of one of said legs being nested within the sides of the other leg and defining a hollow enclosure before being driven, the ends of the sides of one of said legs being bent away from the sides of the other leg adjacent to said head to facilitate the nesting together of said legs, the other end of said legs being of substantially the same dimension as said one end and defining a penetrating portion, the bight portion of at least one of said legs being curved toward the other leg intermediate the ends for deflecting at least one of said legs outwardly when said nail is driven into the base material, the penetrating portion of each of said legs including a cutting edge along said bight portion and an upwardly inclined shearing edge along each of said sides, said upwardly inclined shearing edges being disposed at an angle of at least 20° and not more than 45° from a plane normal to the axis of said legs for cutting a plug from said covering material, a first pair of ears struck downwardly from said head beside each of said connecting strips and bent inwardly toward each other to a position underlying each of said connecting strips, a second pair of ears struck downwardly from said head through openings in each of said connecting strips and bent outwardly away from each other to a position underlying said strips connecting said other ends of said strips to said head, whereby when said nail is driven said cutting and shearing edges sever a plug from said covering material and thereafter said means for deflecting said legs causes said legs to spread apart.

* * * * *